| United States Patent [19] | [11] Patent Number: 4,818,143 |
| Chou | [45] Date of Patent: Apr. 4, 1989 |

[54] ASBESTOS DECOMPOSITION

[75] Inventor: Song-Tien Chou, Manhattan, Kans.

[73] Assignee: ASD, Inc., Houston, Tex.

[21] Appl. No.: 141,541

[22] Filed: Jan. 7, 1988

[51] Int. Cl.$^4$ ................................................. B09B 3/00
[52] U.S. Cl. ..................................... 405/128; 106/121; 264/38; 501/155; 405/129
[58] Field of Search ................ 405/128, 129; 501/155, 501/122, 32; 106/120, 121, 454; 264/37, 38, 183, 184

[56] References Cited

U.S. PATENT DOCUMENTS

| 3,378,615 | 4/1968 | Zisney | 106/121 X |
| 4,131,661 | 12/1978 | Spitz et al. | 264/38 |
| 4,328,197 | 5/1982 | Flowers | 106/454 X |
| 4,476,235 | 10/1984 | Chevalier-Bultel et al. | 501/155 X |
| 4,678,493 | 7/1987 | Roberts et al. | 501/155 X |

Primary Examiner—Dennis L. Taylor
Attorney, Agent, or Firm—Matthews & Branscomb

[57] ABSTRACT

A method for decomposing and disposing of asbestos compounds through the use of a two part chemical process. The first step in the chemical process involves the decomposition of asbestos through the use of sulfuric acid. The second step of the process involves the solidification of the products resulting from the decomposition step. The efficacy of the invention process is enhanced by the use of a lubricating agent, an accelerating agent, and a cementitious or pozzolanic substance. The asbestos treated with the invention process is decomposed and forms a solidified mixture which can be easily handled and safely disposed of at a disposal site.

9 Claims, No Drawings

ASBESTOS DECOMPOSITION

FIELD OF THE INVENTION

The present invention relates generally to the field of processing and decomposition of hazardous materials. Specifically, the present invention provides an effective method for decomposing and disposing asbestos.

BACKGROUND

Asbestos contamination in buildings around the world is a serious health problem which has been the subject of intense controversy in recent years. Once considered the "miracle mineral" in the insulation industry, asbestos has been positively linked to respiratory diseases. Examples of asbestos-related diseases include asbestosis, lung cancer, and mesothelioma. A survey by the U.S. Environmental Protection Agency (E.P.A.) estimates that asbestos in various forms has been used in insulation in more than 30,000 public schools and 730,000 public or commercial buildings.

A general industry to abate or remove offending asbestos has been developed in the United States to address the problems discussed above. In addition, a regulation for asbestos issued by the Department of Labor's Occupational Safety and Health Administration for asbestos requires very special handling and ultimate disposal of the waste products produced by the asbestos abatement industry. The process provided by the present invention is intended to provide an effective method for decomposing and effectively disposing of asbestos-related compounds.

SUMMARY OF THE INVENTION

The present invention provides an effective solution to the problem of decomposing and disposing of asbestos compounds through the use of a two part chemical process. The first step in the chemical process involves the decomposition of asbestos through the use of sulfuric acid. The first step can be implemented in two stages. In the first stage, concentrated sulfuric acid is used to decompose the asbestos components. In the second stage, relative dilute sulfuric acid is used to totally decompose the soluble decomposition components remaining from the first stage. The acid used in the first step of the process can be either new or waste sulfuric acid. The second step of the process involves the solidification of the products resulting from the decomposition step. The efficacy of the invention process is enhanced by the use of a lubricating agent, an accelerating agent, and a cementitious or pozzolanic substance, e.g., Portland cement, ground blast-furnace slag, cement-kiln dust, fly ash or microsilicate, or a mixture of cementitious and pozzolanic materials. The asbestos treated with the invention process is decomposed and forms a solidified mixture which can be easily handled and safely disposed of at a disposal site.

DETAILED DESCRIPTION OF THE PREFERRED EMBODIMENT

In accordance with the present invention, there is provided an improved method and process for the decomposition and disposal of asbestos compounds. The process of the present invention is broadly comprised of two steps. The first step is decomposition of the asbestos and the second step is the solidification of the products resulting from the first step so that the final product is nonhazardous.

The specific process of the present invention decomposes and fixes or solidifies waste asbestos with a series of novel chemical reactions involving sulfuric acid, a lubricating agent, an accelerating agent, and a cementitious or pozzolanic substance, e.g., Portland cement, ground blast-furnace slag, cement-kiln dust, fly ash or microsilicate, or a mixture of cementitious and pozzolanic materials. The process of the present invention is extremely efficient and can decompose asbestos into rejuvinated silica which can be reclaimed and used as a constituent in numerous subsequent applications. Using the decomposition process of the present invention, therefore, the asbestos is decomposed and forms a solidified mixture which can be easily handled and safely disposed of at a disposal site.

The process of the present invention comprises two steps. The first step involves the decomposition of asbestos and the other is the solidification of the products of decomposition. Sulfuric acid is used to decompose asbestos. The acid may be new or waste sulfuric acid. With Chrysotile asbestos, typically the following chemical reaction will occur when the pH value of the acid is less than 2:

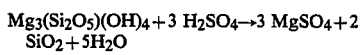
$$Mg_3(Si_2O_5)(OH)_4 + 3\ H_2SO_4 \rightarrow 3\ MgSO_4 + 2\ SiO_2 + 5H_2O$$

Excess acid is used to complete the reaction. Silicate (sand) and Magnesium sulfate are formed through this reaction. Often, the decomposition step (step 1) requires two stages. In the first stage, concentrated sulfuric acid is used to effect, through dehydration or oxidation and partial hydrolysis, the following: (a) detachment of asbestos from the solid object to which it is attached; (b) disintegration, and partial decomposition and dissolution of the container of asbestos; (c) disintegration, and partial decomposition and dissolution of the components other than asbestos; and (d) loosening, breakage and partial decomposition of the asbestos structure. In the preferred embodiment of the present invention, the sulfuric acid used in the above-described first stage has a concentration ranging between 70 percent weight and 98 percent weight, with the preferable concentration being approximately 90 percent weight.

In the second stage, relatively dilute spent or fresh sulfuric acid at a lower concentration is used to totally decompose and dissolve soluble decomposition products through hydrolysis. In the preferred embodiment of the present invention, the sulfuric acid used in the second stage has a concentration of less than 50 percent weight, with the preferable concentration being approximately 30 percent weight. At the end of the decomposition step, the mixture must have a pH value below 2 and preferably below 1 to ensure the essentially complete decomposition of the asbestos.

Before solidifying the resultant mixture with pozzolanic materials, lime or hydrated lime is added to increase the pH value of the mixture to near 7. During the neutralization, calcium sulfate is formed. A mixture of calcium and magnesium sulfates is cementitious. Other asbestos are decomposed through similar reactions.

After neutralization, the lubricating agent and accelerating agent is added to the mixture. This is followed by addition of a pozzolanic material to accomplish solidification. The interparticle lubricant used in the present invention accelerates the homogenization of the mixture while solidifying the waste. The accelerating agent is used to accelerate the rates of cementation processes. In the preferred embodiment of the process of the present invention, the lubricating agent is formed by dispersing water-soluble polymer (e.g., polyethylene glycol-2000) or monomer (e.g., propylene glycol and glycerine) or a mixture of them into the water. The viscosity of the mixture is increased and consequently the diffusivity of every component participating in cementation processes is reduced, thereby decelerating the rates of these processes. The accelerating agent contains ferric chloride, or a similar substance, e.g., calcium chloride, magnesium chloride, or a mixture of these substances. While the rates of cementation processes occurring through the mixture are retarded by the lubricating agent at the outset of the reaction, these rates will gradually be enhanced. Although the chemical reactivity of these compounds are initially inhibited by the lubricating agent, the accelerating agent will eventually participate in accelerating the rates of the cementation processes.

The decomposition and solidification process provided by the present invention offers numerous advantages, including the following: (1) co-disposal with waste acid, e.g., pickling acid, possible; (2) decomposition of asbestos (detoxification) accomplished; (3) significant volume reduction attained; (4) high degree of safety is maintained - no generation of hazardous or toxic by-product such as gaseous HCl, gaseous HF, $Cl_2$ and $F_2$ when other acids are used; room temperature and atmosphere operation.

The operation of the process provided by the present invention can be understood by the following summary of steps and examples:

FIRST EXAMPLE OF ASBESTOS DECOMPOSITION PROCESS

| | |
|---|---|
| Step 1. | Add 160.00 grams of 36% sulfuric acid |
| Step 2. | Add 40.00 grams of Chrysotile asbestos |
| Step 3. | Add 20.00 grams of water |
| Step 4. | Add 20.00 grams of calcium hydroxide |
| Step 5. | Add 6.00 grams of accelerating agent |
| Step 6. | Add 14.00 grams of lubricating agent |
| Step 7. | Add 180.00 grams of pozzolanic materials |

The ratios of the chemicals and the steps used in the first example described above is especially efficient for decomposing and disposing of asbestos containing relatively small amounts of foreign matter. The time required for decomposition is extremely short—on the order of ten to twenty minutes depending on the mode of operation and the concentration of the acid used. Variations in the concentration of the acid can be made without departing from the scope of the present invention. Furthermore, pure acids, diluted or waste acids can be used. The additional water used in step 3 is used to render the mixture homogeneous.

| | |
|---|---|
| Step 1. | Add 10.00 grams of 96% sulfuric acid in a beaker |
| Step 2. | Add 140.00 grams of waste |
| Step 3. | Add 66.70 grams of 30% sulfuric acid |
| Step 4. | Add 33.30 grams of water |
| Step 5. | Add 15.00 grams of calcium hydroxide |
| Step 6. | Add 10.00 grams of accelerating agent |
| Step 7. | Add 15.00 grams of lubricating agent |
| Step 8. | Add 80.00 grams of pozzolanic materials |

The ratios of chemicals and the steps described in the second example described above is especially efficient for decomposing and disposing of asbestos containing relatively large amounts of foreign matter. The time required for decomposition is extremely short—on the order of one to five minutes depending on the mode of operation and the concentration and amount of the acid used. As was the case for the first example, variations in the concentration of the acid can be made without departing from the scope of the present invention. Again, pure acids, diluted or waste acids can be used. The additional water used in step 4 is used to render the mixture homogeneous.

While the method of the present invention has been described in connection with the preferred embodiment, it is not intended to limit the invention to the specific form set forth herein, but on the contrary, it is intended to cover such alternatives, modifications and equivalents as may be included within the spirit and scope of the invention as defined by the appended claims.

We claim:

1. A method for decomposing asbestos containing relatively small amounts of foreign matter, comprising the steps of:
    reacting a quantity of material containing asbestos with a quantity of sulfuric acid to produce a first mixture, said first mixture containing reaction products comprising completely decomposed particles of said asbestos, said first mixture having a pH value of less than 2;
    reacting said first mixture with a neutralizing agent to produce a second mixture, said second mixture having a pH value of approximately 7,; and
    reacting said second mixture with a lubricating agent, an accelerating agent, and a cementitious or pozzolanic substance to produce a third mixture, said third mixture comprising a solidified compound containing said decomposed particles of said asbestos, said solidified mixture providing effective containment of said asbestos particles.

2. The method according to claim 1, said step of reacting said material containing asbestos to produce a first mixture, comprising the step of reacting said material with a quantity of sulfuric acid having a concentration of between 15 and 70 percent weight, preferably 50 percent weight.

3. The method according to claim 2, said neutralizing agent being selected from the group consisting of alkaline materials, preferably of lime, hydrated lime or calcium hydroxide.

4. The method according to claim 3, said accelerating agent being selected from the group consisting of calcium chloride, ferric chloride, and magnesium chloride.

5. The method according to claim 4, said lubricating agent being selected from the group consisting of water-soluble polymers or monomers.

6. A method for decomposing asbestos containing relatively large amounts of foreign matter, comprising the steps of:
    reacting a quantity of material containing asbestos with a first quantity of sulfuric acid, said first quantity of sulfuric acid having a concentration of between 70 and 98 percent weight, to produce a first mixture containing partially decomposed asbestos particles;
    reacting said first mixture with a second quantity of sulfuric acid, said second quantity of sulfuric acid having a concentration of less than 50 percent weight, to produce a second mixture containing completely decomposed particles of asbestos, said second mixture having a pH value of less than 2; reacting said second mixture with a neutralizing agent to produce a third mixture containing said completely decomposed particles of asbestos, and having a pH value of approximately 7; and solidifying aid third mixture with a lubricating agent, an accelerating agent and a cementitious or pozzolanic substance to produce a nontoxic material containing said completely decomposed particles of asbestos.

7. The method according to claim 6, said neutralizing agent being selected from the group consisting of alkaline materials, preferably lime, hydrated lime or calcium hydroxide.

8. The method according to claim 7, said accelerating agent being selected from the group consisting of calcium chloride, ferric chloride, and magnesium chloride.

9. The method according to claim 8, said lubricating agent being selected from the group consisting of water-soluble polymers or monomers.

* * * * *